US010957328B2

(12) United States Patent
Page et al.

(10) Patent No.: US 10,957,328 B2
(45) Date of Patent: Mar. 23, 2021

(54) AUDIO DATA TRANSFER

(71) Applicant: Cirrus Logic International Semiconductor Ltd., Edinburgh (GB)

(72) Inventors: Michael Page, Gloucestershire (GB); Thomas Ivan Harvey, Northcote (AU); Vitaliy Sapozhnykov, Cheltenham (AU)

(73) Assignee: Cirrus Logic, Inc., Austin, TX (US)

( * ) Notice: Subject to any disclaimer, the term of this patent is extended or adjusted under 35 U.S.C. 154(b) by 261 days.

(21) Appl. No.: 16/027,728

(22) Filed: Jul. 5, 2018

(65) Prior Publication Data

US 2019/0013027 A1    Jan. 10, 2019

Related U.S. Application Data

(60) Provisional application No. 62/529,678, filed on Jul. 7, 2017.

(30) Foreign Application Priority Data

Jul. 26, 2017  (GB) ...................................... 1712054
Nov. 10, 2017 (GB) ...................................... 1718648

(51) Int. Cl.
   *G10L 17/22*     (2013.01)
   *G10L 25/51*     (2013.01)
   (Continued)

(52) U.S. Cl.
   CPC .............. *G10L 17/22* (2013.01); *G06F 21/32* (2013.01); *G06F 21/34* (2013.01); *G06F 21/42* (2013.01);
   (Continued)

(58) Field of Classification Search
   CPC .......... G06F 21/32; G06F 21/34; G06F 21/42; G06F 21/44; G06F 21/606;
   (Continued)

(56) References Cited

U.S. PATENT DOCUMENTS 7,627,477 B2 * 12/2009 Wang ................. G06K 9/00536
                                                    341/110
2009/0276068 A1 * 11/2009 Morohoshi .......... H04N 21/482
                                                    700/94
(Continued)

FOREIGN PATENT DOCUMENTS

EP       2541830 A1    1/2013
GB       2541466 A     2/2017
WO    2017074564 A1    5/2017

OTHER PUBLICATIONS

International Search Report and Written Opinion of the International Searching Authority, International Application No. PCT/GB2018/051920, dated Sep. 19, 2018.
(Continued)

*Primary Examiner* — Hemant S Patel
(74) *Attorney, Agent, or Firm* — Jackson Walker L.L.P.

(57) ABSTRACT

This application relates to transfer of microphone data from a microphone (101, 102, 102a, 201) to a processing module, such as voice biometric authentication module (111) in a secure manner, such that the receiving module can trust that the received audio is genuine. An authentication module (203) is configured to receive microphone data ($D_M$) representative of an audio signal received at the microphone (201), and generate from the microphone data, authentication data ($D_A$) for certifying that the microphone data did pass via the authentication module. The first authentication data ($D_A$) comprises information relating to distinguishing characteristics of the audio content of the microphone data and may, for instance be an acoustic fingerprint of the audio content. The authentication data, may be cryptographically signed or encrypted and sent with the microphone audio to allow a receiver to verify that the audio is genuine and the content has not been substantially altered. The process may
(Continued)

be robust to processing of the data that results in imperceptible changes in the audio content.

21 Claims, 3 Drawing Sheets

(51) Int. Cl.
*G06F 21/34* (2013.01)
*G06F 21/44* (2013.01)
*G06F 21/32* (2013.01)
*H04L 9/32* (2006.01)
*G10L 19/018* (2013.01)
*G06F 21/60* (2013.01)
*G06F 21/42* (2013.01)

(52) U.S. Cl.
CPC ............ *G06F 21/44* (2013.01); *G06F 21/606* (2013.01); *G10L 25/51* (2013.01); *H04L 9/3247* (2013.01); *G06F 2221/2129* (2013.01); *G10L 19/018* (2013.01)

(58) Field of Classification Search
CPC ............ G06F 2221/2129; G10L 17/22; G10L 19/018; G10L 25/51; H04L 9/3247
USPC .......................................................... 700/94
See application file for complete search history.

(56) References Cited

U.S. PATENT DOCUMENTS

| | | | |
|---|---|---|---|
| 2011/0038594 A1* | 2/2011 | Symons | G11B 20/0021 386/224 |
| 2011/0173185 A1* | 7/2011 | Vogel | G06F 16/683 707/722 |
| 2012/0140935 A1* | 6/2012 | Kruglick | G10L 21/00 381/56 |
| 2013/0246800 A1 | 9/2013 | Stewart | |
| 2015/0178487 A1 | 6/2015 | Hu et al. | |
| 2016/0005026 A1* | 1/2016 | Bouffioux | G06Q 20/3224 705/44 |
| 2016/0094338 A1 | 3/2016 | Pappachan et al. | |
| 2017/0093852 A1 | 3/2017 | Khosravi et al. | |
| 2017/0110144 A1 | 4/2017 | Sharifi et al. | |
| 2019/0371330 A1* | 12/2019 | Lin | G10L 25/21 |

OTHER PUBLICATIONS

Examination report under Section 18(3), UKIPO, Application No. GB1711161.8, dated Sep. 10, 2019.
Combined Search and Examination Report under Sections 17 and 18(3), UKIPO, Application No. GB1712054.4, dated Jan. 16, 2018.
Combined Search and Examination Report under Sections 17 and 18(3), UKIPO, Application No. GB1718648.7, dated Apr. 18, 2018.
Combined Search and Examination Report under Sections 17 and 18(3), UKIPO, Application No. GB1711161.8, dated Jan. 8, 2018.
International Search Report and Written Opinion of the International Searching Authority, International Application No. PCT/GB2018/051137, dated Jun. 18, 2018.

* cited by examiner

AUDIO DATA TRANSFER

FIELD OF DISCLOSURE

The field of representative embodiments of this disclosure relates to methods, apparatus and/or implementations concerning or relating to audio data transfer and especially to transfer of audio data between a microphone and a component for processing the audio data in a secure manner.

BACKGROUND

It is increasingly being proposed to provide electronic devices with voice user interfaces to allow a user to interact with a system using their voice.

One advantage of this interface, for example in devices such as smartphones, tablet computers and the like, is that it may allow the user to operate at least some aspects of the device in a hands-free manner. Speech recognition techniques, i.e. techniques to extract the words spoken from the voice audio signal, may, for example, be used to detect that a particular trigger phrase has been spoken to set the device to expect a spoken command and to recognize a command when spoken and to perform operations in response. For example, if the spoken command asks for publicly available information, then the interface may cause a query to be submitted to an internet search engine in order to be able to supply that information to the user.

In some cases, some level of authentication may be desirable to verify the identity of the user before acting on a command, whether spoken or not, for example if the command relates to personal information, or requests some financial transaction.

It is expected that biometric based authentication will replace passwords, particularly on mobile platforms, as long passwords are difficult to remember and difficult to type on such devices. Voice based biometric authentication may be one convenient authentication technique, especially where the device has a voice control interface as it allows a user to maintain a generally hands-free mode of user interaction.

The voice user interface may thus comprise some form of biometric speaker recognition, i.e. some analysis of the voice audio input signal to extract characteristics of that signal distinctive to one of one or more users. Speaker recognition may allow the identity of the user to be verified with a high level of confidence with more security than passwords and more conveniently than other biometric verification methods, such as fingerprint or iris patterns, and used to allow operations, such as financial transactions, although multiple different types of authentication (e.g. passwords, fingerprint/iris/voice recognition, etc.) may be combined in order to increase the security of a particular operation.

While the use of biometrics in general increases the security of a particular operation, by ensuring the person requesting that the operation be carried out is a registered user of that device, biometric solutions are not invulnerable to attacks from third parties. For example, a fingerprint of a particular user may be stolen (e.g. "lifted" from an object the user has touched) by a third party intent on using that fingerprint to access the user's device. A user's voice may be recorded by a third party and played back to the device in order to bypass voice biometric security. A picture of the user's iris may be acquired and used to bypass iris recognition software.

All of these techniques require significant effort on the part of the third party attempting to gain access to the user's device. Further, even if successful, the techniques allow that third party access to just a single device at a time. A more modern technique for bypassing biometric security systems, requiring fewer resources and scalable to multiple devices at a time, may involve the surreptitious installation of malware on the user's device. For example, such malware may be able to bypass or otherwise prevent security processes from functioning effectively, and thus allow the third-party attacker access to the devices on which it is installed.

SUMMARY

Embodiments of the present disclosure relate to methods and apparatus that may help defend voice based biometric authentication systems.

According to an aspect of the present invention there is provided a microphone authentication apparatus comprising: an authentication module configured to:
  receive microphone data representative of an audio signal received at a microphone, and generate from the microphone data, first authentication data for certifying that the microphone data did pass via the authentication module, wherein the first authentication data comprises information relating to distinguishing characteristics of the audio content of the microphone data; and
  an output module configured to: output a microphone audio signal based on the microphone data, and output the first authentication data for authentication of the output microphone audio signal.

In some embodiments the first authentication data may be selected to be data that will not vary significantly with imperceptible changes in the audio content of the microphone data.

In some implementations the output module may be configured to output the microphone data over a first logical data path and output the first authentication acoustic data over a separate logical data path to the first logical data path. In some implementations the output module may be configured to output the microphone audio signal comprising the microphone data within a first frequency band and comprising the first authentication acoustic data encoded in a second, higher, frequency band.

In some embodiments the microphone authentication apparatus may further comprise a first input for receiving an analogue output signal from the microphone, and an analogue-to-digital convertor coupled to the first input for generating the microphone data based on the analogue output signal. The apparatus may also comprise a microphone transducer coupled to the first input for generating said analogue output signal. The microphone transducer, analogue-to-digital converter and authentication module may, in some instances, be formed within a digital microphone package. The microphone transducer, analogue-to-digital converter and authentication module may be formed as an integrated circuit. The microphone transducer may be a MEMS microphone transducer.

In some implementations the analogue-to-digital converter and authentication module are formed in an integrated audio circuit and the first input comprises a connector of said integrated circuit for receiving analogue output signals from an off-circuit microphone transducer. The audio circuit may be an audio codec. The audio circuit may be configured to receive the analogue output signal at the first input from a microphone transducer which is part of a host device in which the audio circuit is housed.

The microphone authentication apparatus may further comprise a first processing module for processing the microphone data to provide the microphone audio signal for output by the output module. The processing may cause imperceptible changes to the audio content of the microphone data. The first processing module may be configured to apply data compression to the microphone data.

In some embodiments a signing module may be coupled to the output module, for receiving the first authentication data, and cryptographically signing the first authentication data for sending to the output module. The first authentication data may be signed with a first key such that the first authentication data may be verified by a second key as having been generated by the microphone authentication apparatus. The signing module may sign the first authentication data using symmetric cryptography, in which case the first key may be the same as the second key, e.g. there is a pre-shared session key, or using asymmetric cryptography, in which case the first key may be complementary to the second key, e.g. private and public keys.

In some embodiments a cryptographic module may be coupled to the output module, for receiving the first authentication data, and encrypting the first authentication data for sending to the output module.

In some embodiments the first authentication data may comprise information relating to spectral peaks of the audio content of the microphone data. In some embodiments the first authentication data may comprise information relating to signal power of the audio content of the microphone data in a frequency band of interest.

The microphone authentication apparatus may form part of a transmitting device comprising together with a first processing module configured to process the microphone data to provide the microphone audio signal for output by the output module. The processing may cause imperceptible changes to the audio content of the microphone data.

Aspects also relate to audio data verification apparatus. Thus in another aspect there is provided an audio data verification apparatus for authenticating whether a received microphone audio signal corresponds to an audio signal that passed through an authentication module, the audio data verification apparatus comprising:
  a receiving module configured to receive the microphone audio signal and first authentication data;
wherein the first authentication data comprises information relating to distinguishing characteristics of some audio content; and
  a determination module for determining whether the audio content of the received microphone audio signal matches the first authentication data.

The audio data verification apparatus may further comprise an authentication data generation module for generating second authentication data, wherein the second authentication data comprises information relating to distinguishing characteristics of the audio content of the received microphone audio signal which is generated so as to be comparable to the first authentication data. The second authentication data may be selected to be data that will not vary significantly with imperceptible changes in audio content.

The determination module may be configured to determine whether the audio content of the received microphone audio signal matches the first authentication data by comparing the second authentication data to the first authentication data. The determination module may be configured to determine that the audio content of the received microphone audio signal matches the first authentication data if a determined error between the first authentication data and the second authentication data is below a defined threshold.

The first authentication data may be received over a separate logical data path to the microphone audio signal.

In some implementations the receiving module may be configured to split the microphone audio signal into a first frequency band comprising the audio content of interest and a second, higher frequency, band comprising the authentication data.

In some embodiments, if the audio content of the received microphone audio signal does not match the first authentication data, the determination module may determine that the received microphone audio signal does not substantially correspond to an audio signal that passed through the authentication module. If the audio content of the received microphone audio signal does match the first authentication data the determination module may determine that the received microphone audio signal does substantially correspond to an audio signal that did pass through the authentication module.

The audio data verification apparatus may further comprise a signature verification module configured to: receive the first authentication data; and verify whether the first authentication data is signed by a valid signature. The signature verification module may be configured to verify whether the first authentication data is signed by a valid signature by using a trusted key value that is the same as or complementary to a trusted first key of a trusted authentication module. The signature verification module may be configured to send a control signal to the determination module indicating whether or not the first authentication data is validly signed. If the determination module determines that the audio content of the received microphone audio signal does not match the first authentication data and/or the signature verification module determines the first authentication data is not validly signed, a control signal may be output to a voice biometric user authentication module to indicate that the received microphone audio signal could not be authenticated. If the determination module determines that the audio content of the received microphone audio signal does match the first authentication data and the signature verification module determines the first authentication data is validly signed, a control signal may be output to a voice biometric user authentication module to indicate that the received microphone audio signal is authenticated.

The audio data verification apparatus may further comprise a cryptographic module configured to receive the first authentication data as encrypted data and decrypt the first authentication data.

The audio data verification apparatus may further comprise a second processing module for processing the received microphone audio signal. The processing may cause imperceptible changes to the audio content of the microphone audio signal. The second processing module may be configured to apply data decompression to the microphone audio signal.

Aspects also relate to an audio system comprising: a microphone authentication apparatus as described in any of the variants above and an audio data verification apparatus as described in any of the variants above. The microphone audio signal may be received at the audio data verification apparatus over a non-bit exact data channel between the microphone and the audio data verification apparatus. The audio system may further comprising voice biometric user authentication module for verifying whether the received microphone audio signal corresponds to the voice of a registered user. In some embodiments the audio data verification apparatus may be housed in a first electronic device and the microphone authentication apparatus may be housed in an accessory device capable of digital data transmission to the first electronic device.

In another aspect there is provided an audio data verification apparatus comprising:
    a first processing module for receiving input digital data, wherein said processing module may be configured to receive digital microphone audio data;
    wherein said processing module comprises a verification module for verifying whether digital audio data is received with accompanying first authentication data that indicates that the received digital audio data was authenticated by an authentication module.

Also provided is a method of authenticating microphone data, the method comprising:
    receiving microphone data representative of an audio signal received at a microphone;
    generating, within a trusted domain, authentication data for certifying that the microphone data did pass via the trusted domain; wherein the authentication data comprises information relating to distinguishing characteristics of the audio content of the microphone data;
    outputting a microphone audio signal based on the microphone data; and
    outputting the authentication data.

Also provided is a method of authenticating an audio signal as having originated at a microphone, the method comprising: receiving the audio signal; receiving first authentication data; and determining whether the audio content of the received audio signal matches the first authentication data.

In another aspect there is provided a digital microphone apparatus comprising: a microphone transducer; an analogue-to-digital converter for generating digital microphone audio data based on an output of the microphone transducer; an authentication module for generating an authentication acoustic fingerprint based on the digital microphone audio data; and an output for outputting the digital microphone audio signal with the authentication acoustic fingerprint.

In another aspect there is provided an electronic device comprising: a microphone; a voice biometric authentication module for verifying whether or not a user is a registered user by analysing voice audio data; and an authentication module in a signal path between the microphone and the voice biometric authentication module for generating an authentication acoustic fingerprint for audio data received from the microphone.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Embodiments of the present disclosure relate to methods and apparatus for transfer, with data authentication, of audio data received from a microphone. The authentication allows an audio data verification apparatus receiving audio data, to verify that the audio data was validly received from the microphone, which may for instance be a microphone of an accessory apparatus. The audio data verification apparatus may comprise a processing module for authentication of the identity of a user, for instance a voice based biometric authentication module.

Figure 1:
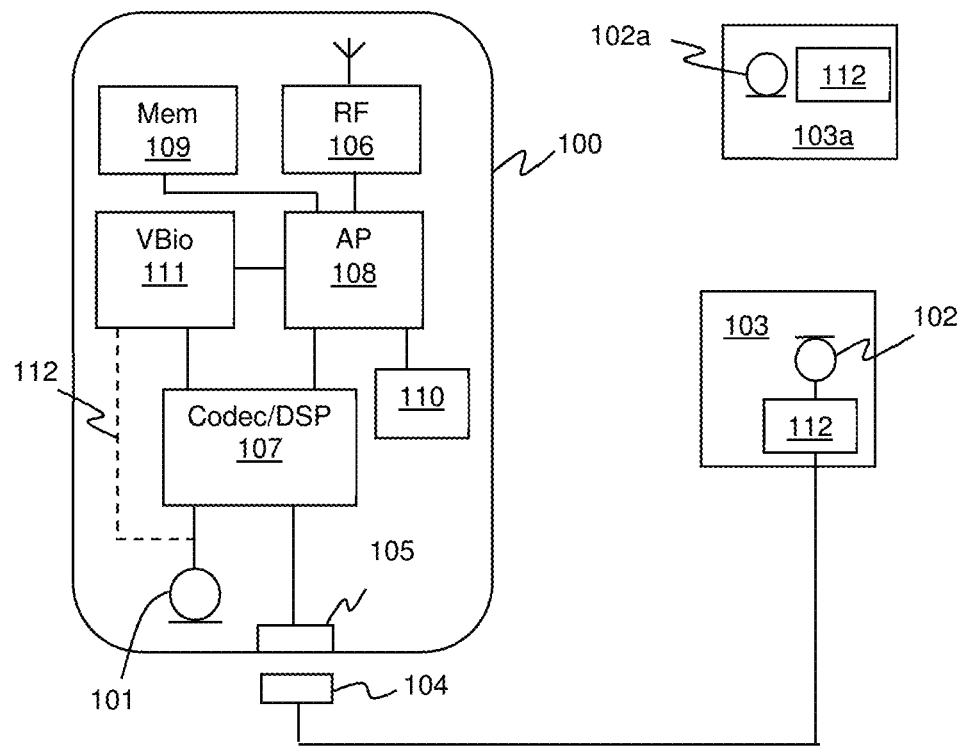
FIG. 1 illustrates an electronic device having a voice authentication module.

FIG. 1 illustrates one example of an electronic device 100, such as a mobile telephone or tablet computer for example. The electronic device 100 may comprise at least one microphone 101 for providing audio signals corresponding to detected sounds. A microphone 101 of the electronic device 100 may provide an analogue microphone audio signal but in some embodiments the microphone 101 may be a digital microphone that outputs a digital microphone audio signal.

Additionally or alternatively the device 100 may be operable, in use, to receive audio signals from at least one external microphone of an accessory apparatus. An accessory apparatus 103 may, in some instances, be removably physically connected to the electronic device 100 for audio data transfer, for instance by a connector 104 of the accessory apparatus making a mating connection with a suitable connector 105 of the electronic device. Audio data received from the accessory apparatus may be analogue or may, in some instances, comprise digital audio data. Digital data may be transferred via any suitable digital data protocol, for instance a USB protocol.

In some instances, an accessory apparatus 103a may be configured for local wireless transfer of audio data from a microphone 102a of the accessory apparatus 103a to the electronic device 100, for instance via a wireless module 106 of the electronic device 100. Such wireless transfer could be via any suitable wireless protocol such as WiFi or Bluetooth™ for example.

Audio data from an on-board microphone 101 of the electronic device 100 and/or audio data from a microphone 102/102a of the accessory apparatus 103/103a may be processed in a variety of different ways depending on the operating mode or use case of the electronic device 100 at the time. Conveniently at least some processing is applied in the digital domain and thus, if necessary, the received microphone data may be converted to digital. The digital microphone data may be processed by audio processing circuitry 107 which may, for instance comprise an audio codec and/or a digital signal processor (DSP) for performing one or more audio processing functions, for instance to apply gain and/or filtering to the signals, for example for noise reduction.

A control processor 108 of the electronic device, often referred to as an applications processor (AP), may control at least some aspects of operation of the electronic device and may determine any further processing and/or routing of the received audio data. For instance for telephone communications the received audio data may be forwarded to the wireless module 106 for broadcast. For audio or video recording the data may be forwarded for storage in a memory 109. For voice control of the electronic device 100 the audio data may be forwarded to a speech recognition module 110 to distinguish voice command keywords.

The device 100 may also comprise a voice biometric authentication module 111 for analysing audio data received from microphone 101 and/or 102 and determining whether the audio data corresponds to the voice of a registered user, i.e. for performing speaker recognition.

The voice biometric authentication module 111 receives input audio data, e.g. from the microphone 101, and compares characteristics of the received audio data with user-specific reference templates specific to a respective pre-registered authorized user (and maybe, for comparison, also with reference templates representative of a general population). Voice/speaker recognition techniques and algorithms are well known to those skilled in the art and the present disclosure is not limited to any particular voice recognition technique or algorithm.

The voice biometric authentication module 111 may be activated according to a control input conveying a request for voice biometric authentication, for example from the AP 108. For example, a particular use case running on the AP 108 may require authentication to wake the device 100, or to authorize some command, e.g. a financial transaction. If the received audio data corresponds to an authorized user, the voice biometric authentication module 111 may indicate this positive authentication result, for example by a signal BioOK which is sent to the AP 108. The AP 108 (or a remote server that has requested the authentication) may then act on the signal as appropriate, for example, by authorizing some activity that required the authentication, e.g. a financial transaction. If the authentication result were negative, the activity, e.g. financial transaction, would not be authorised.

In some embodiments the voice biometric authentication module 111 may be enabled by a voice activity event detected, for example, by the codec/DSP 107 or another dedicated module (not shown). For example, when the device 100 is in a low-power sleep mode, any voice activity may be detected and a signal VAD (voice activity detected) communicated to the biometric authentication module 111. In the event of a positive user authentication, the signal BioOK may be used by the AP 108 to alter the state of the device 100 from the low-power sleep mode to an active mode (i.e. higher power). If the authentication result were negative, the mode change may not be activated.

In some embodiments there may be a signal path 112 for providing audio data directly from a microphone 101 to the voice biometric authentication module 111 for the purposes of voice authentication. However in at least some embodiments and/or for some use cases audio data from microphone 101 of the electronic device 100 or from a microphone 102 of an accessory apparatus 103 may be provided to the voice biometric authentication module 111 via the AP 108 and/or via codec/DSP 107 or via a path including some other processing modules.

Whilst voice biometric authentication module 111 has been illustrated as a separate module in FIG. 1 for ease of reference it will be understood that the voice biometric authentication module 111 could be implemented as part of or integrated with one or more of the other modules/processors described, for example with speech recognition module 110. In some embodiments the voice biometric authentication module 111 may be a module at least partly implemented by the AP 108 which may be activated by other processes running on the AP 108. In other embodiments the voice biometric authentication module 111 may be separate to the AP 108 and in some instances may be integrated with at least some of the functions of the codec/DSP 107.

As used herein, the term 'module' shall be used to at least refer to a functional unit or block of an apparatus or device. The functional unit or block may be implemented at least partly by dedicated hardware components such as custom defined circuitry and/or at least partly be implemented by one or more software processors or appropriate code running on a suitable general purpose processor or the like. A module may itself comprise other modules or functional units.

The voice biometric authentication module 111 thus provides a way for a user to verify that they are an authorised user in order to access some information or service. As mentioned the voice biometric authorisation may be used to access sensitive information and/or authorise financial transactions etc. Such an authentication may, in practice, be subject to an attack, i.e. an attempt by an unauthorised user to falsely obtain access to the information or service.

There are various ways in which a voice authentication system for an electronic device such as a smartphone or the like could potentially be attacked. In theory, if an attacker had access to the device itself, the attacker could attempt to interfere with the operation of the device, by electrically modifying the device, however such an attack would have a number of practical difficulties and may not be of significant concern or could be protected against by some anti-tamper measures.

The voice biometric authentication module 111 itself may thus be considered secure, in that an authentication signal from the voice biometric authentication module 111 cannot be faked, for example, the voice biometric authentication module 111 will only generate an authentication signal indicating that authentication is successful if the audio input supplied to the voice biometric authentication module 111 does match the registered user.

However, it is conceivable that an attacker could generate false audio data and attempt to provide said false audio to the voice biometric authentication module 111 as if it were genuine audio data from a registered user speaking at that time, the false data being selected to have a high chance of being falsely recognised as matching the registered user.

For instance, it may be possible for an attacker to defeat voice biometric authentication by recording a registered user speaking without their knowledge and using such recording later when attacking a secure service. Such recorded audio may thus genuinely correspond to the registered user, but is used falsely during an attempt to access some service which is not authorised by the registered user.

There are various routes in which such false audio could be supplied to the voice biometric authentication module 111. As noted above, in at least some embodiments and/or for some use cases, audio data from microphone 101 of the electronic device 100, or from a microphone 102 of an accessory apparatus 103, may be provided to the voice biometric authentication module 111 via the AP 108 or via some communication path that may be configured or controlled via the AP 108. The AP 108 may typically be capable of running many different applications or software processes and may be configured so that software processes can be installed from outside sources by a user directly into the processor 108 and associated memory 109, for instance via connector 105 or via the wireless module 106 for example. This provides a route for malicious software (malware) to be installed surreptitiously, and for this malware to corrupt the operation of the biometric authentication.

For example it may be possible that malware could be installed to run on an insecure area of the AP 108 and which may attempt to access a service which requires authentication from the voice biometric authentication module 111. The malware may for instance control a communications bus that is capable of supplying audio data to the voice biometric authentication module 111 so as to supply false audio, e.g. previously recorded data, to the voice biometric authentication module 111 in an attempt to achieve authentication. If malware were installed on the user's device, the malware may be arranged to record the user's voice (using the user's device) without the user being aware. Such recorded audio could be used as the basis of an attempt to achieve authentication by an attacker.

Additionally or alternatively, another route for supplying false audio to the voice biometric authentication module 111 may be via an accessory apparatus. As mentioned above the electronic device 100 may be configured to operate with an accessory apparatus 103/103a with a microphone and the registered user may, when using voice authentication, speak into the microphone of the accessory apparatus 103/103a. The electronic device 100 may thus be operable, in some use cases, to supply audio data received from an accessory apparatus 103/103a, to the voice biometric authentication module 111. An attacker could thus connect a malicious accessory to the electronic device to supply a recording of the registered user's voice as if it were a data stream from a microphone of the accessory, whether via a wired connection, e.g. USB or the like, or via some suitable wireless protocol, such as Bluetooth™. The malicious accessory could appear to the electronic device as any other accessory and thus the electronic device would forward the received audio data to the voice biometric authentication module 111 for authentication.

To guard against such an attack using a recording of a user's voice it is known for some applications that use voice biometric authentication to, in the event that a request to access a secure service is received, generate a prompt to prompt the user to say one or more selected words or phrases. The words or phrases may be selected with a degree of randomness so as to vary each time in an unpredictable way. This requires the user to utter the words or phrase corresponding to the prompt. If the correct prompt is then uttered and the voice corresponds to the relevant user then the authentication result may be positive, otherwise the authentication will fail, i.e. produce a negative authentication result.

However if the number of possible prompts is relatively small it may be possible for an attacker to obtain a recording of at least some of the possible prompts and supply the appropriate prompt if asked. It may also be possible for an attacker with a recording of the registered user voice to attempt to synthesise audio data for the required prompt. For example, if malware has been inadvertently installed in the electronic device 108 then, as the AP 108 controls the codec/DSP 107 and may be configured for recording, it is possible that the malware could be configured to, unknown to the user, record and/or analyse voice data from the user over time. When sufficient data has been recorded and/or analysed the malware may attempt to access the secure service. The secure service may then generate a voice prompt and alert the voice biometric authentication module 111 to perform authentication. The malware may identify the selected voice prompt and then supply an audio signal which is synthesised or formed from the various recordings of the user's voice to correspond to the requested prompt. If this faked audio signal is good enough the voice biometric authentication module 111 will recognise the audio as corresponding to the registered user and also corresponding to the selected voice prompt and falsely generate a positive authentication result.

Embodiments of the present disclosure relate to methods and apparatus that at least mitigate at least some of the above mentioned issues. In particular, in some embodiments audio data from a microphone may be authenticated as genuinely having been captured by a microphone, which may be a particular microphone. In particular, embodiments of the present disclosure relate to the use of authentication data generated from the microphone data, where the authentication data comprises information relating to distinguishing characteristics of the content of the microphone data. As the authentication data relates to distinguishing characteristics of the audio content, i.e. characteristics of the audio signal itself rather than any particular format in which the microphone data is represented, the authentication data can be robust to processing of the microphone data which causes some changes to the microphone data itself, if the encoded audio data, i.e. the audio content, is not significantly changed. Thus the authentication data will still be valid if the format of the microphone data is changed and/or if there is any processing that has a relatively limited impact on the audio information of importance, e.g. which causes imperceptible changes to the audio content of the microphone data. Embodiments of the disclosure do not rely on a bit-exact data channel between the microphone 102 or 102a and the electronic device 100, or on any knowledge of what non-bit exact processing may be present in such a data channel.

Embodiments relate to a microphone authentication apparatus that may be associated with a microphone. For example an accessory apparatus 103 or 103a may comprise a microphone authentication apparatus 112, as will be described in more detail herein. The microphone authentication apparatus can be used to provide information about the data being output from a microphone that sufficiently characterises the audio content, i.e. metadata that can be used to verify whether any received microphone audio data has been tampered with in any significant way. The microphone authentication apparatus may also sign the metadata, i.e. the characteristic information, e.g. with a cryptographic signature, so that it can be verified that the authentication data did originate from a trusted microphone. The signature may be based on a key that changes over time so as to prevent recorded audio, with the appropriate signed metadata, from being falsely used at a later time. The microphone authentication apparatus may thus output audio data received by a microphone together with signed authentication data so as to allow a downstream component to verify that the audio data is authentic and is contemporary. The microphone authentication apparatus may thus be used as part of a system where a data path between the microphone and a processing module, in particular a voice biometric authentication module, may not be trusted.

Figure 2:
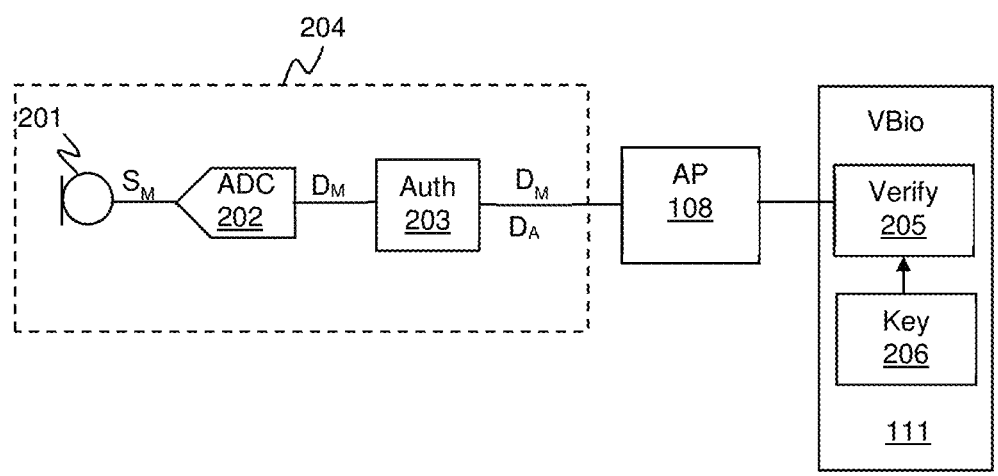
FIG. 2 illustrates one example of an embodiment of a microphone authentication apparatus.

FIG. 2 illustrates one example of an embodiment of a microphone authentication apparatus. FIG. 2 illustrates that a microphone transducer 201 may be coupled to an analogue-to-digital converter 202 to provide a digital signal, $D_M$, representative of the acoustic audio signal detected by the microphone transducer 201. The digital microphone audio data, $D_M$, is passed to a microphone authentication apparatus 203, which processes the data, $D_M$, to generate first authentication data, $D_A$, for the microphone audio data, $D_M$. As used here the term first authentication data shall be taken to mean some data which is derived from the digital microphone audio data, $D_M$, and which can be used to verify that audio data received downstream did pass via the data microphone authentication apparatus 203 and has not been tampered with. The first authentication data, $D_A$, comprises information relating to distinguishing characteristics of the audio content of the microphone data, i.e. relating to the underlying audio content.

For example, the first authentication data, $D_A$, may comprise some acoustic fingerprint of the audio content, i.e. data that can be used to identify a particular segment of audio. As used herein the term acoustic fingerprint shall be used to refer to information about the audio data, e.g. metadata, that relates to characteristics of the audio content and the way it would be perceived or recognised as audio.

An acoustic fingerprint of an acoustic signal may, in some embodiments, be a digital summary deterministically generated from the audio signal. An acoustic fingerprint may be based on the perceptual characteristics of the audio, i.e. those features which discriminate different sounds from one another. If two data streams encode audio signals that would sound alike to the human ear when played, their acoustic fingerprints may match, i.e. be similar to one another, even if their binary representations are different, whereas two audio signals encoding audio content that would sound unalike to a listener would be expected to have recognizably different acoustic fingerprints. In other words, an acoustic fingerprint is based on characteristics of the underlying audio content of an audio signal, not the characteristics of the particular data format. Acoustic fingerprints are not bitwise fingerprints of the data stream, which would be sensitive to any small changes in the data itself. Acoustic fingerprints are more analogous to human fingerprints where small variations that are insignificant to the features the fingerprint uses are tolerated.

An acoustic fingerprint may include one or more characteristics of the audio signal such as, for example, average zero crossing rate, average spectrum, spectral flatness, prominent tones across a set of frequency bands, and/or the way such characteristics vary with time.

In some embodiments the first authentication data, $D_A$, which is representative of the acoustic audio signal, may comprise data regarding the signal power in an audio band of interest. For instance the acoustic fingerprint may comprise an indication of an envelope of signal power in an appropriate frequency band for voice audio. The signal power in such a frequency band may be determined relatively easily, as will be described in more detail later, and provides suitable data for authentication. Any perceptible change to the audio content would be expected to result in a variation in the corresponding signal power and how it evolves over time.

The first authentication data, $D_A$, may therefore be used to distinguish one audio signal from another audio signal, regardless of the data format of the audio signal. The first authentication data, $D_A$ may be selected to be effectively unique for a particular audio segment. However, the first authentication data refers to key distinguishing characteristics of the audio content such that minor, e.g. imperceptible, changes may be made to the audio content and/or the particular format for encoding the audio signal, without significantly affecting the first authentication data.

It will be understood that in at least some implementations audio signals sent between devices such as the accessory 103 or 103a and the electronic device 100 may be subject to some processing, for instance such as data compression in order to reduce the size of the data and thus the resources required to transmit the data, with some corresponding data decompression at the received side. Most such audio processing techniques will make changes to the digital encoding of an audio file, but ideally without significantly affecting the way the audio signal will be perceived by the human ear when played to a user. In other words, the processed data will, when played to a user, sound substantially the same as the original unprocessed data. A robust acoustic fingerprint can thus allow audio data to be identified after it has gone through such processing, e.g. lossy data compression and decompression using perceptual coding, even if the audio quality has been reduced, and/or the way the data itself is encoded has changed.

The first authentication data is generated such that corresponding authentication data, generated in the same way based on microphone data received from the microphone over a data channel subject to some not bit-exact processing, would match the first authentication data. By match it is meant that the relevant authentication data would be the same or statistically highly-similar, i.e. the same fingerprint would be produced for the data transmitted and the data received or the fingerprints would be sufficiently similar according to some defined metric.

The first authentication data, $D_A$, can thus be provided to some receiving module, e.g. the voice biometric authentication module 111, and can be used by that receiving module to verify whether or not the audio content of a received audio signal corresponds to the audio which was processed by the microphone authentication apparatus 203, with only minor, i.e. imperceptible, changes. It will of course, be understood that the receiving module needs to be able to trust the first authentication data itself is authentic. In some embodiments therefore, as will be discussed in more detail later, the first authentication data may be cryptographically signed so that the receiving module can verify that the authentication data is genuine and then use the authentication data to verify the received audio.

In some embodiments, the transducer 201, ADC 202 and microphone authentication apparatus 203 are all included within a trusted domain 204, in that it can be trusted that operation of the domain 204 with respect to authenticating the microphone audio data $D_M$ cannot be tampered with, e.g. by the AP 108.

In some embodiments, the ADC 202 and microphone authentication apparatus 203 may be included with the transducer 201 in a microphone package. That is the trusted domain 204 may be part of a digital microphone component. Thus, for example, microphone 101 illustrated in FIG. 1 may be a digital microphone comprising the components within the trusted domain 204 illustrated in FIG. 2. The microphone transducer 201 may be integrated, with the ADC 202 and microphone authentication apparatus 203, in an integrated circuit. The microphone transducer, in some embodiments may be a MEMS microphone transducer.

Some embodiments thus relate to a trusted domain 204 which outputs digital data corresponding to digital microphone audio data and first authentication data for the digital microphone audio data. In such embodiments therefore the digital data output from the digital microphone is effectively authenticated at the source of the digital data.

In some embodiments, however, the microphone authentication apparatus 203 and possibly the ADC 202 may be formed as part of a trusted domain of an audio circuit, such as a codec, which is distinct from, but arranged for receiving audio data from, the microphone transducer 201, i.e. the microphone transducer is off-circuit and may be packaged separately.

For example ADC 202 and microphone authentication apparatus 203 may be formed on a codec 107 and connected to receive a signal $S_M$ from an off-chip microphone transducer, which could be an on-board microphone 101 of the electronic device 100 or a microphone 102 of a connected accessory apparatus 103. The connection between the codec 107 and the microphone 101 and/or connector 105 for connecting to a microphone 102 of a connected accessory apparatus 103 may be such that it can be trusted that the signal $S_M$ received at the codec 107 did originate at the microphone 101 or 102. For example an on-board microphone 101 may be hardwired to a pin of codec 107 in such a way that signals received at that pin must have originated from the relevant on-board microphone. For an accessory apparatus 103/103a, a microphone 102/102a of the accessory may be coupled to authentication apparatus 112 as part of a trusted domain.

In such embodiments signals cannot be injected without direct physical access to the individual device or accessory apparatus, possibly even requiring access to internal components or wiring, and thus the analogue audio path may be trusted as being difficult to interfere with. The ADC 202 and microphone authentication apparatus 203 may be arranged in a trusted domain that receives the analogue audio signals and arranged to authenticate the digital audio data before it is forwarded elsewhere. In some embodiments the microphone authentication apparatus 203 may operate directly on the output of the ADC 202 so that the digital microphone data is effectively authenticated as soon as it is converted to digital. However if some signal processing can be implemented within the trusted domain, e.g. within a trusted domain of the codec 107 or within module 112 of the accessory 103/103a, then at least some signal conditioning, e.g. filtering etc. may be performed on the digital microphone data before authentication.

The microphone authentication apparatus 203 thus receives digital microphone data, $D_M$, which can be trusted as having originated from a relevant microphone 201. The microphone authentication apparatus 203 processes this data to generate first authentication data, $D_A$, which can then be sent along with the digital microphone audio data $D_M$. The microphone authentication apparatus 203 may generate the first authentication data, $D_A$, as some form of acoustic fingerprint, for example the first authentication data may comprise information relating to spectral peaks in the audio content.

The first authentication data, $D_A$, may be sent along with the microphone audio data $D_M$ in a variety of ways depending on the format in which the microphone audio data is to be transmitted.

In some implementations the microphone audio data $D_M$ and the first authentication data, $D_A$, may be sent via the same interface, for instance as different channels of data according to an appropriate data format or via different data transport mechanisms, i.e. via separate logical data paths. For instance, if the microphone audio data, $D_M$, is transmitted via a data protocol that has defined frames the first authentication data, $D_A$, could be sent in some predetermined bit arrangement with respect to the digital audio data, i.e. as the first or last so many bits or frames of data or interspersed at predefined bit intervals. If the data protocol allows for multiple channels of data, the first authentication data, $D_A$, could be sent along with the microphone audio data, $D_M$, via a suitable side channel. It will be appreciated that the microphone audio data, $D_M$, may be isochronous data. The first authentication data, $D_A$, could be sent as asynchronous data.

The microphone audio data, $D_M$, may be transferred to meet a suitable audio data rate. As noted first authentication data, $D_A$, may be generated for one or more frames, or for a defined period, of the microphone audio data $D_M$. The first authentication data, $D_A$ may therefore be transmitted asynchronously at a data rate which is lower, and possibly significantly lower, than required for the audio data $D_M$. Some data transmission protocols allow for transmission of data via a control channel at a lower data rate than the main data payload. In some instances therefore it may be advantageous to transmit the first authentication data, $D_A$, via an appropriate data transport mechanism, e.g. control channel, of a suitable transmission protocol.

For example in some implementations the microphone audio data $D_M$ could be sent as digital data in accordance with a suitable USB (Universal Serial Bus) protocol and the first authentication data $D_A$ could be sent via some other USB channel. For example the microphone authentication apparatus 203 may transmit the first authentication data $D_A$ via a data transport mechanism such as may be used for a USB HID (Human Interface Device). Thus the microphone authentication apparatus 203 may be configured to effectively act as, or similar to, a USB HID endpoint, as would be understood by one skilled in the art, and to transmit the first authentication data $D_A$ as control data as would be suitable for a USB HID. As one skilled in the art will understand, the data rates typical for USB HID endpoints would be sufficient to provide a suitable data rate for the first authentication data $D_A$, e.g. a data rate of a 1 kbit per second or so. Such an implementation may, in particular, be suitable where the microphone 102 and microphone authentication apparatus 203 may form part of an accessory apparatus 102 which may be connected to a host device via any suitable USB connector. It will be understood however that other types of wired connection for digital data transfer could be implemented and the microphone audio data $D_M$ and the first authentication data $D_A$ may be transmitted via any suitable logical data transport mechanisms.

In some instances the first authentication data $D_A$ could be encoded into an audio data channel used to transmit the microphone audio data $D_M$ in a way that does not substantially interfere with the microphone audio data $D_M$ of interest, i.e. the voice audio content. In some implementations the first authentication data $D_A$ could be encoded as a modulation in a frequency band outside a frequency band of interest for voice audio. For instance some digital data channels may operate at sample rates that are suitable for high quality digital audio data transfer, e.g. a sample rate of the order of 48 kHz or so. For voice audio however a frequency band of interest may extend up to a frequency of a few kHz, and frequencies above about 8 kHz may not be that significant. Thus a digital data channel suitable for audio at a relatively high sample rate, say of the order of 48 kHz, may contain information about frequencies that are not particularly useful for speaker recognition. In some embodiments therefore the microphone audio data $D_M$ and the first authentication data $D_A$ could be sent via the same audio channel, with the microphone audio data $D_M$ corresponding to a first frequency band of interest, e.g. a frequency band extending to a maximum frequency f1, which could be about 8 kHz in some implementations, and the first authentication data $D_A$ encoded in a second higher frequency band, e.g. a frequency band with a minimum frequency equal to or greater than f1. The first authentication data $D_A$ may be encoded in the second frequency band in a way that does not alter the microphone audio data $D_M$ in the first frequency band, as will be discussed in more detail below. In some embodiments the second frequency band may be a relatively high frequency band which corresponds to frequencies that are substantially inaudible, e.g. a frequency band with a minimum frequency of the order of 16 kHz or so.

The relevant audio data in the microphone audio data signal $D_M$, may thus be substantially unchanged by the authentication, in that it is still representative of the original acoustic audio signal received at the microphone 201. It will be appreciated that the microphone audio data, $D_M$ itself is not encrypted in this example and the microphone audio data, $D_M$, may thus be used directly for a number of a different purposes. For purposes where no verification regarding the microphone audio data $D_M$ is required the data may be used directly.

This means that no significant latency or processing overhead is necessarily added to use of the microphone audio data. In some instances the microphone audio data may be buffered before transmission, whilst generating first authentication data, $D_A$, for that portion of the microphone audio data $D_M$, so that the first authentication data, $D_A$, can be transmitted contemporaneously with the portion of the microphone audio data, $D_M$, to which it relates. For instance transmission of the microphone audio data, $D_M$, may be delayed for sufficient time such that the first authentication data, $D_A$, can be generated for one or more frames of microphone audio data, $D_M$, and sent as part of that frame or group of frames. Such a processing delay or latency will generally be relatively low. In some instances however, especially if a low latency for the audio signal path is desired, the microphone audio data, $D_M$, may be transmitted without any significant delay and the relevant first authentication data, $D_A$, transmitted later. The first authentication data, $D_A$, could be transmitted with a predefined timing after transmission of a frame of microphone audio data, and/or together with some identification information, so that the first authentication data can be synchronised with a previously transmitted frame of microphone audio data by a receiving module.

FIG. 2 illustrates a signal path from trusted domain 204, having a microphone 102 and microphone authentication apparatus 203, which passes to the voice biometric authentication module 111 via AP 108. It will be understood however that this is just one implementation and there are a number of different ways in which authentication could be implemented, for instance there could be separate paths from the trusted domain 204 to the AP 108 and voice biometric authentication module 111 and/or the audio data could pass to the AP via the voice biometric authentication module 111.

In this embodiment the biometric authentication module comprises an audio data verification apparatus 205, for authenticating whether a received microphone audio signal, i.e. the signal received from the AP 108, passed through the microphone authentication apparatus 203, or a similar authentication module and is substantially unaltered. It will be appreciated that although voice biometrics may be performed by this module, the voice biometrics may be performed by some remote processing to the audio data verification apparatus 205.

Figure 3:
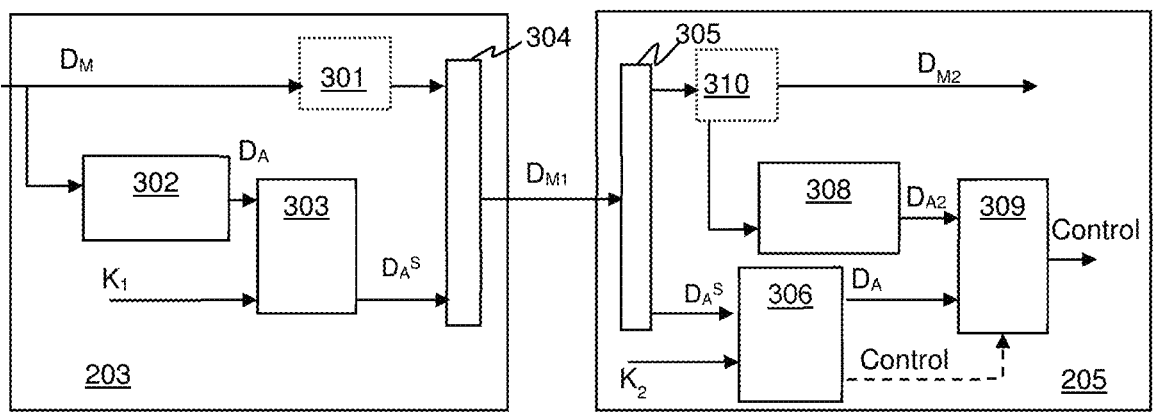
FIG. 3 illustrates one example of a microphone authentication apparatus 203 and an audio data verification apparatus 205 according to some embodiments.

FIG. 3 illustrates one example of a microphone authentication apparatus 203 and an audio data verification apparatus 205 according to some embodiments. In some embodiments, the digital audio data, or microphone data $D_M$ from the microphone is received and passed to a first processing module 301. The first processing module 301 may for example be an encoder or a data compression module. The first processing module 301 may be configured for processing the microphone data $D_M$ to provide a microphone audio signal $D_{M1}$ for output by an output module 304, whereby the processing causes imperceptible changes to the content of the microphone data $D_M$. By imperceptible it is meant that the underlying audio data, when played to a user, would sound substantially the same as the unprocessed original, i.e. any changes would not be perceived. Such processing may include, for example, lossy data compression (and corresponding decompression) and gain changes. Clearly the bit stream may be changed as a result of the processing in a way that would be apparent if one were purely to compare bit streams.

It will be appreciated that where the first processing module 301 applies some data processing such as compression to the audio data, the audio data will be converted to a processed data format. As used herein the terms audio data and audio signal and the like shall be taken to include audio data in a recognised audio format as well as processed versions thereof from which the audio content can be recovered, i.e. audio data is any data where the underlying signal content corresponds to audio.

The microphone authentication apparatus 203 comprises an authentication module 302 which is configured to receive microphone data $D_M$ representative of an audio signal received at a microphone, for example the signal $S_M$ received at microphone 201, and to generate from the microphone data, $D_M$, first authentication data, $D_A$, for certifying that the microphone data did pass via the authentication module 302 and the audio content is substantially unaltered, wherein the first authentication data, $D_A$, comprises information relating to distinguishing characteristics of the audio content.

The digital microphone data $D_M$ is therefore also passed to the authentication module 302 which generates from the microphone data $D_M$, first authentication data, $D_A$, for certifying that the microphone data, $D_M$, did pass through the microphone authentication apparatus 203 and the audio content is substantially unaltered, wherein the first authentication data, $D_A$, comprises information relating to distinguishing characteristics of the audio content.

In some embodiments the first authentication data, $D_A$ comprises an acoustic fingerprint, which may be a robust acoustic fingerprint. The acoustic fingerprint may be robust to processing of the microphone data whereby the processing causes imperceptible changes to the content of the microphone data. In other words, if two acoustic fingerprints are generated, one from the original microphone data $D_M$ and one from the microphone audio signal $D_{M1}$, the acoustic fingerprints would match, i.e. be the same or statistically similar. Therefore, by producing acoustic fingerprints, which look at the characteristics of the underlying audio that the microphone data represents, the microphone apparatus avoids the need for knowledge of exactly the type of processing that the microphone data may or may not undergo, before it reaches a device at which it must be authenticated using the generated fingerprint.

The first authentication data, $D_A$ may be digitally signed using a cryptographic module 303. The cryptographic signing module 303 may be coupled to an output module 304 to output the signed first authentication data, $D_A^S$. The signing module 303 cryptographically sign the first authentication data $D_A$ with a first key $K_1$ for sending to the output module 304.

The signing module 303 may apply a known cryptographic signing protocol, e.g. based on symmetric cryptography such as the Advanced Encryption Standard (AES), or on asymmetric cryptography such as the RSA algorithm or Elliptic-curve-cryptography (ECC), using a key $K_1$. For symmetric cryptography the key may be a shared key, known to the microphone authentication apparatus 203 such that the first authentication data may be verified by a second key $K_2$ equivalent to the first key. Alternatively, for asymmetric cryptography the key $K_1$ may be a private key and the first authentication data may be verified by a second key, $K_2$ which is a public key. In some embodiments the signing module 303 may apply a cryptographic signing protocol based on symmetric cryptography with a shared key, as this may have a lower processing overhead than asymmetric cryptography, but the shared key may be agreed for a temporary period using asymmetric authentication.

Signing the first authentication data, $D_A$, thus allows the audio data verification apparatus 205 to verify that the first authentication data, $D_A$, was validly received from the microphone authentication apparatus 203. In some embodiments however the cryptographic module 303 may instead be configured to encrypt the first authentication data, $D_A$. Encrypting the first authentication data, $D_A$, may require more processing than simply cryptographically signing the first authentication data, $D_A$, but has the advantage that the content of the first authentication data is obscured. If the process by which the authentication data is generated is known it may be possible to attack the system by maliciously modifying audio content to contain different speech while matching the same authentication data. The exact process by which the authentication data is generated may therefore be kept secret. However if malware is able to examine the content of the first authentication data $D_A$ and the corresponding audio it may be possible to determine, e.g. reverse engineer, the process by which the first authentication data is generated. Encrypting the first authentication data obscures the content and prevents such reverse engineering.

The output module 304 may be configured to output a microphone audio signal, $D_{M1}$ based on the microphone data $D_M$. It will be appreciated that in some embodiments, no first processing module may be present and therefore, in these embodiments $D_{M1}$ is equivalent to $D_M$. The output module may also be configured to output the first authentication data, $D_A^S$, for authentication of the output microphone audio signal, $D_{M1}$.

The output module 304 receives the first authentication data, $D_A^S$ and the microphone data $D_M$ and outputs a microphone audio signal, based on the microphone data and the first authentication data. In this embodiment, the microphone audio signal, $D_{M1}$ is the microphone data, $D_M$ having passed through the first processing module 301. It may, in some embodiments, be a data compressed version of the microphone data, $D_M$.

In some instances the first authentication data, $D_A^S$ may be simply added to the microphone audio signal $D_{M1}$ to be transmitted in a predefined way, e.g. as the first or last 2048 bits defined with respect to some frame boundary. In some instances if audio data is to be transmitted via a protocol such as Soundwire™ that allows for multiple channels of data to be transmitted, then the first authentication data could be sent via an appropriate side channel. In some embodiment the output module 304 may be configured to make use of a control channel, such as may be used by a USB HID endpoint, for transmitting the first authentication data $D_A^S$.

As mentioned above in some embodiments the first authentication data $D_A^S$ could be encoded as part of an audio signal comprising the microphone audio signal $D_M$, where the first authentication data $D_A^S$ is encoded in a frequency band which is different to that of interest for voice audio. In which case the output module 304 may be configured to act as an audio modem for encoding the first authentication data $D_A^S$. There are various ways that the first authentication data $D_A^S$ could be encoded as a high frequency part of an audio signal which also comprises the microphone audio signal $D_M$, as would be understood by one skilled in the art.

For example the microphone audio signal $D_M$ may be low-pass and/or band-pass filtered so as to correspond to a first frequency band of interest for voice audio before determining the first authentication data $D_A^S$, i.e. before determining the audio fingerprint. In some implementations the first frequency band may correspond to a frequency band of the order of 100 Hz to 8 KHz. To encode the first authentication data $D_A^S$, the output module 304 may generate or receive a white noise signal, e.g. a broadband signal with a relatively flat power spectrum outside of the first frequency band. The white noise signal may be high-pass filtered to correspond to a second frequency band that does not substantially overlap with the first frequency band. A gain applied to this high frequency signal may then be modulated between at least two different levels to encode the first authentication data $D_A^S$. The data may be encoded in any suitable way, e.g. in frames defined by suitable frame headers. It will be understood however that there are other ways in which the first authentication data $D_A^S$ could be encoded into a higher frequency band of an audio signal.

It will be appreciated that, in some implementations, the second frequency band may comprise some components that could be audible if played to a listener. Typically however the audio signal used for speaker recognition may not be intended for playback to a listener and thus the fact that the modulation in second frequency band could, in theory, be perceptible if the audio signal were played to a listener may not be an issue. If desired the audio signal could be low pass filtered prior to any playback. In some implementations however, given that the required data rate for the first authentication data $D_A^S$ is relatively low and the bandwidth available in the audio signal may be relatively high, the first authentication data $D_A^S$ may be encoded so as to be near the noise floor for the signal so as to reduce the chance of the modulation being perceptible. Additionally or alternatively the first authentication data $D_A^S$ may be encoded into a high frequency band which is effectively inaudible for a listener, e.g. a frequency band above about 16 kHz for example, say a near ultrasonic frequency band of about 16-20 kHz for example.

For voice authentication the microphone audio signal and first authentication data may be provided to a verification module 205 which may be within a receiving device such as the electronic device 100. A receiving module 305 may receive the microphone audio signal $D_{M1}$ and the first authentication data, $D_A^S$.

As mentioned the first authentication data may be received over a side-channel to the microphone audio signal $D_{M1}$, e.g. as a control channel for USB HID endpoints. In some embodiments however the first authentication data $D_A^S$ may be encoded as a high frequency modulation, of an audio signal, in which case a version of the received audio signal may be low pass filtered to provide the microphone audio signal $D_{M1}$ and a version of the received audio signal may be high pass filtered and decoded, e.g. by measuring power of the signal in the second frequency band, to provide the first authentication data $D_A^S$.

The first authentication data, $D_A^S$, may be passed to a cryptographic module 306. In some embodiments the cryptographic module may be a signature verification module 306 which may verify whether the received first authentication data, $D_A^S$ is signed by an authentic signature. As noted above, the first authentication data, $D_A^S$, may have been signed by an authentic signature in the signing module 303 of the microphone authentication apparatus 203 resulting in the signed first authentication data $D_A^S$. In some embodiments the cryptographic module may be a decryption module 306 which may decrypt the first authentication data. As noted above, in some embodiments the first authentication data, $D_A^S$, may have been encrypted in the cryptographic module 303 of the microphone authentication apparatus 203.

The cryptographic module 306 may thus verify whether or not the first authentication data, $D_A^S$, is signed with a valid signature and/or decrypt the data. The cryptographic module 306 may receive the first authentication data, $D_A^S$ and, using a second key $K_2$ determine whether the signature is valid or decrypt the data as appropriate. For symmetric cryptography the second key $K_2$ will be the same as the first key $K_1$, but for asymmetric cryptography the first and second keys $K_1$ and $K_2$ will be different and will correspond to public and private keys.

The microphone audio signal $D_{M1}$, or in some embodiments, a signal $D_{M2}$ based on the microphone audio signal $D_{M1}$, may be passed to an authentication data generation module 308 for generating second authentication data $D_{A2}$ based on the received microphone audio signal, $D_{M1}$. In some embodiments, the microphone audio signal may be passed directly to the authentication data generation module 308, however in some instances the received audio data may be first passed through a second processing module 310 before being received by the authentication generation module 308. The second processing module may perform some processing on the microphone audio signal which may cause imperceptible changes to the microphone audio signal. The processing module may, for example, be configured to apply data decompression to the microphone audio signal $D_{M1}$ and/or apply signal level/gain changes.

In some embodiments, the authentication data generation module 308 may generate the second authentication data, $D_{A2}$ in the same manner as the authentication module 302, as described above. Therefore in some examples, the authentication data generation module 308 of the verification module 205 may generate an acoustic fingerprint for the received microphone audio signal in the same way as an acoustic fingerprint was generated by the microphone authentication apparatus 203. If the second authentication data $D_{A2}$, e.g. an acoustic fingerprint, generated for the received audio signal $D_{M1}$ matches, i.e. is the same as or sufficient similar to, the first authentication data $D_A$, e.g. the received acoustic fingerprint, then this indicates that the audio which has been received is substantially the same as the audio used to generate the first authentication data $D_A$.

The first authentication data $D_A$ and the second authentication data $D_{A2}$ may thus be passed to a determination module 309 for comparison. The determination module 309 may be configured to compare the second authentication data, $D_{A2}$ to the first authentication data $D_A$, and determine whether the first authentication data matches the second authentication data.

As noted above the authentication data, e.g. audio fingerprint, may be selected to use features that are unlikely to be substantially transformed by a typical non-bit-exact signal path, for instance a data path that includes perceptual data-reduction codecs and/or gain changes. The authentication data should provide sufficient detail that allows significant changes in the audio content to be detected. However in the embodiment discussed above, where effectively a second acoustic fingerprint is derived for the received audio data in the same way as the first acoustic fingerprint, the acoustic fingerprints need only to match well enough to be confident that the audio is highly unlikely to be completely different speech. The authentication data may be suitable for matching using not more than around 500 ms-1 s of audio. To avoid requiring significant extra data transfer the streaming rate for the first authentication data may be of the order of 1 kbyte per second or lower.

Figure 4A:
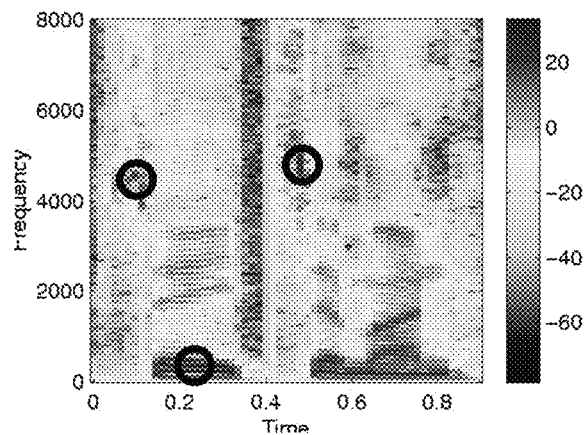
FIG. 4a illustrates one example of the principles of generating suitable authentication data.

As one non limiting example the first authentication data may relate to the position of peaks in a time-frequency representation of a segment of audio data, for example as might be illustrated with a spectrogram. Thus, in one example the authentication module 302 of the authentication apparatus 203 may be configured to generate the first authentication data by taking a segment of the relevant microphone data $D_M$, say 1 s worth of audio, and transform the audio segment into a time-frequency domain, for instance using a sliding window FFT. FIG. 4a illustrates a two-dimensional representation, i.e. spectrogram, showing the relevant signal intensity. The position of a certain number, N, of the highest amplitude peaks in this two-dimensional co-ordinate system may be identified. FIG. 4a illustrates the positions of the three highest peaks by the three black circles. The co-ordinates of these peaks may be determined as used as the first authentication data.

The authentication data generation module 308 of the verification module 205 may also determine the second authentication data in the same way to generate a set of co-ordinates for the N highest amplitude peaks in a spectrogram of nominally the same time segment of the received microphone data $D_{M2}$. It will be understood that if the received audio data is substantially the same, in perceptual terms, as the original audio data, then the second authentication data will be the same as, or statistically similar to, the first authentication data.

Figure 4B:
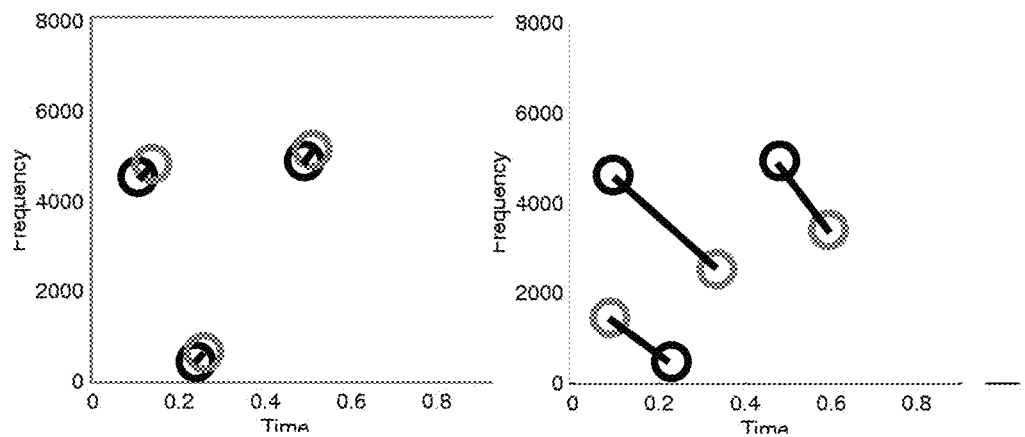
FIG. 4b illustrates examples of matching and non-matching data.

The determination module 309 may determine a statistical measure of the similarity of the corresponding peak co-ordinates. For example FIG. 4b illustrates two examples of the positions of the N highest amplitude peaks (three in this illustrative example but it will be understood that other values of N could be used) as defined in the first authentication data and the second authentication data. In each case the black circles indicate the positions as defined by the first authentication data and the grey circles indicate the positions as defined by the second authentication data. The black lines, which link the centre of the circles in the plot, represent the error vectors, i.e. the vector differences in identified peak position between authenticator and verifier, i.e. between the first authentication data and second authentication data.

In the example illustrated on the left it can be seen that the positions of the peaks in the second authentication data closely match the positions of the peaks in the first authentication data. This indicates that the underlying audio content is substantially similar. The small differences illustrated may be due to a non-bit-exact nature of the audio transfer between the authentication apparatus 203 and verifier module 205, as well as potentially due to algorithm implementation limitations. In the case illustrated on the right however there is a much greater difference and hence a much greater magnitude of the error vectors.

The determination module 309 may thus determine the error vectors and determine whether the error vectors indicate sufficient similarity. For instance the magnitude of each error vector could be compared to an acceptable error threshold and/or the sum of the magnitudes of the error vectors could be compared to a threshold.

Figure 4C:
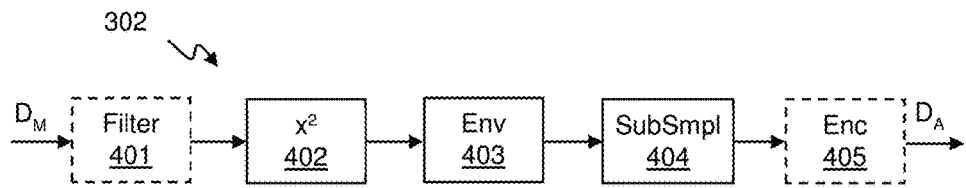
FIG. 4c illustrates another example of generating suitable authentication data.

In another non-limiting example the first authentication data $D_A$ may correspond to the signal power of the microphone data $D_M$ in a frequency band of interest, e.g. a first frequency band suitable for voice audio such as a frequency band of 300 Hz or so to 8 kHz or so. FIG. 4c illustrates one example of an authentication module 302 for generating the first authentication data $D_A$ as the signal power in the voice audio band. FIG. 4 illustrates that the microphone data $D_M$ is received and, if necessary, filtered to correspond to a first frequency band of interest. The microphone data $D_M$ may, for instance be filtered by a filter 401 which may be a suitable bandpass filter. The filtered audio data may be squared in a squaring module 402 to provide an indication of power level. This indication of signal power may be input to an envelope detector 403, which effectively determines the envelope of the signal power. In some instances the envelope detector 403 may effectively low pass filter the indication of signal power and may, for instance, comprise a leaky integrator. The resultant envelope value and how it varies over time can provide a useful audio fingerprint. Any perceptible changes to the audio content in the first frequency band would be expected to result in a significant change in how the signal power varies over time, whereas any imperceptible changes, e.g. due to data compression and decompression would not significantly vary the signal power. The signal power in the audio band can thus be seen as a type of robust acoustic fingerprint which is computationally simple and straightforward to generate.

The envelope detector 403 may operate at a sample rate which is equal to the audio sample rate, which may be of the order of several tens of kHz. The envelope of the signal power will however only vary on at a significantly lower rate. To reduce the amount of data that needs to be transmitted the output of the envelope detector could be sub-sampled at a lower data rate, say of the order of 100 Hz or so, by a sub-sampler 404. In some embodiments an encoder 405 could encode the sub-sampled data in a suitable format, e.g. by a log encode into a multi-bit signal, as the first authentication data $D_A$.

The authentication data generation module 308 of the verification module 205 could generate an indication of signal power of the received audio signal in the same manner, as second authentication data $D_{A2}$, and compare the first and second authentication data.

It should be understood that FIGS. 4a and 4b are for the purposes of explanation only and do not necessarily represent real audio. It will also be understood by one skilled in the art that acoustic fingerprints for identifying audio have been proposed for other purposes and there may be a range of different techniques for generating and comparing suitable acoustic fingerprints. The acoustic fingerprint that may be used in practice may vary.

It will also be appreciated that generating second authentication data in the same way as the first authentication data, e.g. first and second acoustic fingerprints, and determining is there is a sufficient match between the authentication data is only one way in which the first authentication data may be used to verify whether the received audio substantially corresponds to the audio that the first authentication data was derived from. For example in some instances it may not be necessary to explicitly generate second authentication data. The first authentication data could comprise data regarding some characteristic of the audio content, e.g. the position of the highest peaks in a spectrogram, and the received audio could be processed to determine whether such characteristics exists, e.g. is there a peak within a certain defined vector distance of the specified coordinate.

Based on the comparison, the determination module 309 thus determines whether the received microphone audio signal is substantially the same, in terms of audio content, as the microphone data for which the first authentication data was generated. Thus the determination module 309 can determine whether the received microphone data corresponds to microphone data that passed through the authentication module and has been substantially unaltered, in terms of audio content.

If the determination module 309 determines that the received audio signal does not correspond to microphone data that passed through the authentication module, e.g. the second authentication data does not match the first authentication data, a control signal may be output to a voice biometric user authentication module, for example voice biometric authentication module 111 in FIG. 2. The control signal may indicate that the received audio signal could not be verified as having passed through the authentication module, which may thus prompt the voice biometric authentication module 111 to indicate that the microphone audio data could not be reliably verified, whatever the result of the speaker recognition processing. In some embodiments, the control signal may be output to disable the voice biometric user authentication module. It will be appreciated that any form of flag control signal may be output.

If, however, the determination module determines that the received audio does correspond to microphone data that passed through the authentication module, e.g. the second authentication data is a match to the first authentication module, a control signal is output to a voice biometric user authentication module, for example voice biometric authentication module 111. The control signal may be output to indicate that the received audio signal can be verified as having passed through the authentication module, thus indicating that the result of the speaker recognition processing can be validly used. In other embodiments, the control signal may be output to enable the voice biometric user authentication module. It will be appreciated that any form of flag control signal may be output.

If the signature verification module determines that the first authentication data is not signed by an authentic signature, the signature verification module may send a control signal to the determination block. The control signal may for example, indicate the first authentication data is not authentically signed. The control signal may, in some embodiments, disable the determination block. If, however, the signature verification module determines that the first authentication data is validly signed by an authentic signature, the signature verification module may output a control signal to the determination module indicating that the first authentication data is authentically signed. Alternatively, the signature verification block may send a control signal to enable the determination module, and/or to enable the voice biometric user authentication module.

Figure 5:
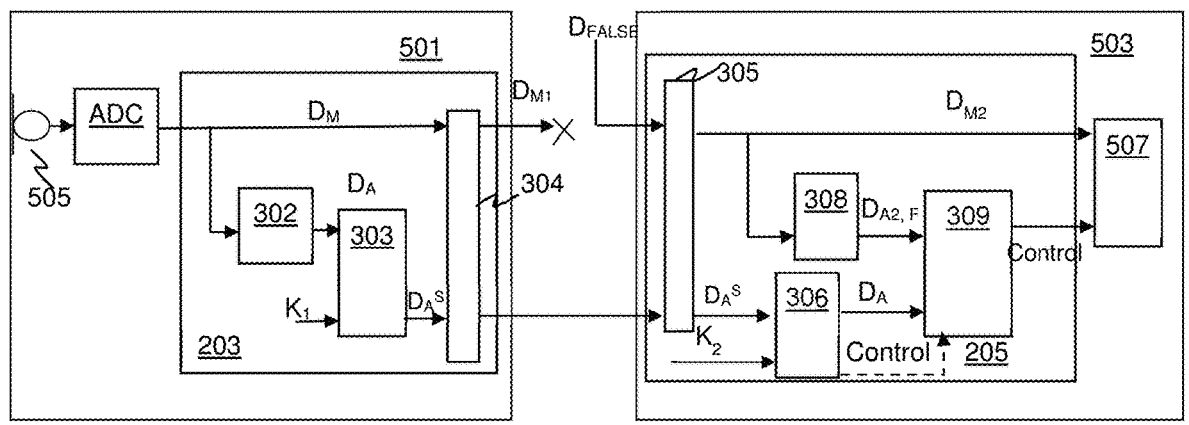
FIG. 5 illustrates an example of an audio system 500 according to some embodiments.

FIG. 5 illustrates an example of an audio system 500 according to some embodiments. The audio system 500 comprises a secure source device 501, for example a headset or accessory for a mobile device. The secure source device 501 may, in some instances, be removably physically connected to a secure receiving device 503 for digital audio data transfer.

In some instances, the secure source device 501 may be configured for local wireless transfer of audio data from a microphone 505 of the secure source device 501 to the secure receiving device 503. Such wireless transfer could be via any suitable wireless protocol such as WiFi or Bluetooth™ for example.

The audio system 500 comprises a microphone authentication apparatus 203 and an audio data verification apparatus 205 as described in relation to any previous figure. In this embodiment the secure receiving device comprises a processing module 507, which may be a voice biometrics user authentication module for verifying whether the received digital microphone data corresponds to the voice of a registered user. It will however be appreciated that the voice biometrics user authentication module may be provided in another connected device.

FIG. 5 in particular illustrates how the audio system 500 detects a man-in-the-middle attack which modifies or substitutes the audio as it passes between the secure source device 501 and the secure receiving device 503.

In this example the attack comprises of substituting the digital microphone data $D_M$ with substitute audio playback, DFALSE. In this case the attacker may have pre-recorded audio of a registered user's voice, which would otherwise pass the voice biometrics user authentication, and generate a false positive in the voice biometrics user authentication module. However, as the second authentication data, $D_{A2,F}$ generated at the audio data verification apparatus will not match the first authentication data, $D_A$, sent by the secure source device 501 to the secure receiving device 503, as the first authentication data was generated based on the real time audio at the microphone 505. The audio system 500 will therefore detect at the determination module 308, that the first authentication data, $D_A$ and the second authentication data, $D_{A2,F}$ do not match, and will therefore disable the voice biometrics user authentication module 507, thereby preventing the man-in-the-middle attack being successful.

Figure 6:
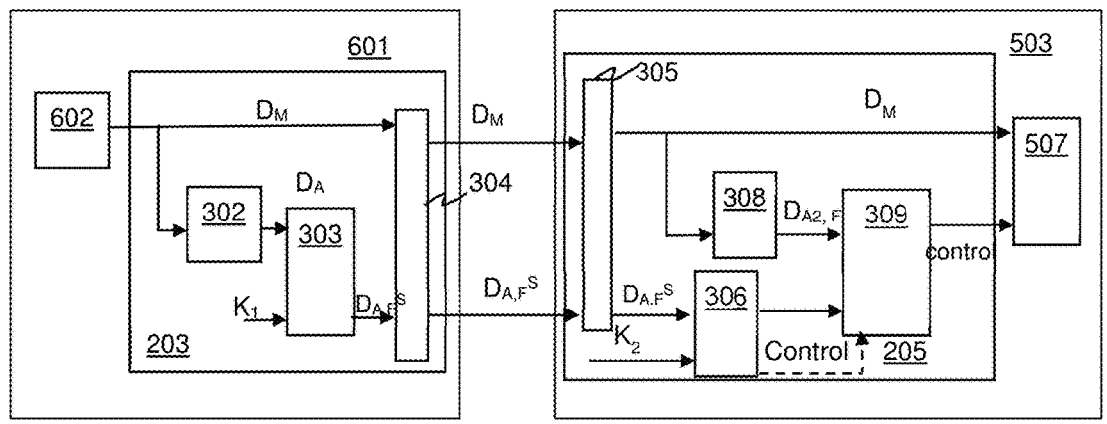
FIG. 6 illustrates an example of an audio system 600 according to some embodiments.

FIG. 6 illustrates an example of an audio system 600 according to some embodiments. The audio system 600 comprises a malicious device 601 and a secure receiving device 503, similar to the secure receiving device of FIG. 5. The malicious device includes an audio source 602 comprising some false audio, e.g. a previously captured recording of a registered user's voice.

FIG. 6 in particular illustrates how the audio system secure receiving device detects a fake device attack. The fake device 601 cannot contain or provide an authentic signature of the first authentication data, $D_A$, even if it is able to produce first authentication data of the correct type, i.e. it selects the correct acoustic characteristics, as the cryptographic key to be used to sign the first authentication data, $D_A$ is only known to be the vendors of secure source devices and the secure receiving device. A fake device would therefore produce incorrectly signed first authentication data. The receiving device would then determine, in the signature verification module 306, that the received first authentication data, $D_A$ was incorrectly signed, and therefore disable the determination module 308, and hence the voice biometrics user authentication module 507.

In general therefore embodiments of the present disclosure relate to electronic devices for receiving or generating microphone data corresponding to sounds detected by a microphone transducer and an authentication module for authenticating the microphone such that an audio data verification apparatus can verify whether the microphone data received was authenticated within the authentication module. In particular, the authentication module may generate a robust acoustic fingerprint for authenticating the microphone data. Embodiments thus relate to digital microphone circuits that authenticate, i.e. sign or certify, digital data output from the digital microphone circuit. In some embodiments the trusted domain may comprise an audio circuit, such as an audio codec, which is not integrated with or packaged with the microphone transducer whose data is to be authenticated but which, in use, is coupled to receive data from the microphone transducer. The audio circuit of the trusted domain, e.g. the codec, may, in use, be connected to receive audio data from the microphone transducer via a trusted signal path which may comprise a wired signal path. The wired signal path may be via a suitable connector of the host device comprising the trusted domain.

Authentication of the audio data from a microphone transducer may be useful for a variety of applications. In particular authentication of the microphone data may be useful for voice based biometric user authentication. A processing module receiving the authenticated audio data may therefore comprise a voice biometric authentication module. Embodiments thus also relate to an audio system comprising a voice biometric authentication module and a data verification module for verifying that audio data received was authenticated in an authentication module as corresponding to audio signals received from a microphone transducer.

The skilled person will recognise that some aspects of the above-described apparatus and methods, for example the discovery and configuration methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

At least some embodiments may be implemented in a host device, especially a portable and/or battery powered host device. Some embodiments may be implemented in an electronic device which may comprise at least one of: a communication device, a mobile or cellular telephone, a smartphone; a computing device; a laptop, notebook or tablet computing device; a media player; a games device; a wearable device; a smartwatch; a voice controlled device. In some instances, authentication apparatus may be embodied in an accessory device for use with any of the above mentioned devices, for instance headsets, headphones, earbuds, speakerphones etc. that may communicate with an electronic device, whether via a wired or wireless connection. Embodiments also relate to a system comprising an electronic device and an accessory. In some embodiments verification apparatus may be implemented in a server or similar.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A microphone authentication apparatus comprising:
an authentication module configured to:
receive microphone data representative of an audio signal received at a microphone, and
generate from the microphone data, first authentication data for certifying that the microphone data did pass via the authentication module, wherein the first authentication data comprises information relating to distinguishing characteristics of the audio content of the microphone data;
an output module configured to:
output a microphone audio signal based on the microphone data, and
output the first authentication data for authentication of the output microphone audio signal; and
a signing module coupled to the output module, for receiving the first authentication data, and cryptographically signing the first authentication data for sending to the output module.

2. A microphone authentication apparatus as claimed in claim 1 wherein the first authentication data is selected to be data that will not vary significantly with imperceptible changes in the audio content of the microphone data.

3. A microphone authentication apparatus as claimed in claim 1 wherein the output module is configured to output the microphone audio signal comprising said microphone data within a first frequency band and comprising the first authentication acoustic data encoded in a second, higher, frequency band.

4. A microphone authentication apparatus as claimed in claim 1 further comprising:
a microphone transducer for an analogue microphone signal;
an analogue-to-digital convertor coupled to microphone transducer for generating the microphone data based on the analogue microphone signal;
wherein the microphone transducer, analogue-to-digital converter and authentication module are formed within a digital microphone package.

5. A microphone authentication apparatus as claimed in claim 1 further comprising a first processing module for processing the microphone data to provide the microphone audio signal for output by the output module, whereby the processing causes imperceptible changes to the audio content of the microphone data.

6. A microphone authentication apparatus as claimed in claim 5 wherein the first processing module is configured to apply data compression to the microphone data.

7. A microphone authentication apparatus as claimed in claim 1 wherein the first authentication data comprises at least one of: information relating to spectral peaks of the audio content of the microphone data; and information relating to signal power of the audio content of the microphone data in a frequency band of interest.

8. A transmitting device comprising:
a microphone authentication apparatus as claimed in claim 1, and
a first processing module configured to process the microphone data to provide the microphone audio signal for output by the output module, whereby the processing causes imperceptible changes to the audio content of the microphone data.

9. An audio system comprising:
a microphone authentication apparatus as claimed in claim 1; and
an audio data verification apparatus configured to receive a microphone audio signal and received first authentication data purported to be output from the microphone authentication apparatus and to determine whether the audio content of the microphone audio signal matches the received first authentication data.

10. An audio system as claimed in claim 9 wherein the microphone audio signal is received at the audio data verification apparatus over a non-bit exact data channel between the microphone and the audio data verification apparatus.

11. An audio system as claimed in claim 9 further comprising:
voice biometric user authentication module for verifying whether the microphone audio signal corresponds to the voice of a registered user.

12. An audio system as claimed in claim 9 wherein the audio data verification apparatus is housed in a first electronic device and the microphone authentication apparatus is housed in an accessory device capable of digital data transmission to the first electronic device.

13. An audio data verification apparatus for authenticating whether a received microphone audio signal corresponds to an audio signal that passed through an authentication module, the audio data verification apparatus comprising:
a receiving module configured to receive the microphone audio signal and first authentication data, wherein the first authentication data comprises information relating to distinguishing characteristics of some audio content;
a determination module for determining whether the audio content of the received microphone audio signal matches the first authentication data; and
a signature verification module configured to:
receive the first authentication data; and
verify whether the first authentication data is signed by a valid signature.

14. An audio data verification apparatus as claimed in claim 13 further comprising an authentication data generation module for generating second authentication data, wherein the second authentication data comprises information relating to distinguishing characteristics of the audio content of the received microphone audio signal which is generated so as to be comparable to the first authentication data.

15. An audio data verification apparatus as claimed in claim 14 wherein the second authentication data is selected to be data that will not vary significantly with imperceptible changes in audio content.

16. An audio data verification apparatus as claimed in claim 14 wherein the determination module is configured to determine whether the audio content of the received microphone audio signal matches the first authentication data by comparing the second authentication data to the first authentication data.

17. An audio data verification apparatus as claimed in claim 13 wherein the receiving module is configured to split the microphone audio signal into a first frequency band comprising said audio content and a second, higher frequency, band comprising said authentication data.

18. An audio data verification apparatus as claimed in claim 13 wherein:
if the audio content of the received microphone audio signal does not match the first authentication data, the determination module is configured to determine that the received microphone audio signal does not substantially correspond to an audio signal that passed through the authentication module; and
if the audio content of the received microphone audio signal does match the first authentication data the determination module is configured to determine that the received microphone audio signal does substantially correspond to an audio signal that did pass through the authentication module.

19. An audio data verification apparatus as claimed in claim 13 wherein if the determination module determines that the audio content of the received microphone audio signal does not match the first authentication data and/or the signature verification module determines the first authentication data is not validly signed, a control signal is output to a voice biometric user authentication module to indicate that the received microphone audio signal could not be authenticated.

20. An audio data verification apparatus as claimed in claim 13 further comprising a processing module for processing the received microphone audio signal, whereby the processing causes imperceptible changes to the audio content of the microphone audio signal.

21. A digital microphone apparatus comprising:
a microphone transducer;
an analogue-to-digital converter for generating digital microphone audio data based on an output of the microphone transducer;
an authentication module for generating an authentication acoustic fingerprint based on the digital microphone audio data;
a signing module, for receiving the authentication acoustic fingerprint and cryptographically signing the authentication acoustic fingerprint; and
an output for outputting the digital microphone audio signal with the cryptographically signed authentication acoustic fingerprint.

* * * * *